United States Patent [19]

Sommer et al.

[11] 3,851,742
[45] Dec. 3, 1974

[54] CONTROL SYSTEM FOR VARIABLE SPEED DRIVE

[75] Inventors: Gordon M. Sommer, Grosse Pointe, Mich.; Alfred C. Williams, Glenview; Donald C. Carlson, Des Plaines, both of Ill.

[73] Assignee: G. M. Sommer Co. Inc., Detroit, Mich.

[22] Filed: Sept. 22, 1972

[21] Appl. No.: 291,218

[52] U.S. Cl. ............ 192/103 F, 251/141, 307/232, 328/133
[51] Int. Cl... F16d 43/284, F16k 31/06, H03k 5/20
[58] Field of Search......... 192/103 R, 103 F, 104 R, 192/104 F; 307/232; 328/133, 155; 251/141

[56] References Cited
UNITED STATES PATENTS

| | | | |
|---|---|---|---|
| 2,860,850 | 11/1958 | Rhodes et al. | 251/141 X |
| 3,385,986 | 5/1968 | Smith | 192/104 R |
| 3,437,188 | 4/1969 | Long | 192/103 F |
| 3,441,342 | 4/1969 | Ball et al. | 328/155 X |
| 3,563,355 | 2/1971 | Goodson et al. | 192/104 F |
| 3,705,358 | 12/1972 | Bauman | 307/232 X |

*Primary Examiner*—Allan D. Herrmann
*Attorney, Agent, or Firm*—Harness, Dickey & Pierce

[57] ABSTRACT

A control system for a variable speed drive unit having an actuating piston for modulating the clamping pressure between a first series of discs mounted for rotation with an input shaft and a second series of plates carried by an output shaft and interleaved with the first series, the system comprising: a sensor associated with the output shaft for providing pulses representative of preselected increments of rotation thereof; a digital delay circuit for delaying the pulses by the period of repetition of a pulse at a desired speed for the drive, a comparator for receiving the delayed pulse and the next subsequent pulse from the sensor for providing output pulses with each pulse having a width representative of the time delay between the receipt of a respective pair of pulses and a polarity representative of whether the delayed pulse led or lagged the subsequent pulse from the sensor, and an integrator for integrating the pulses from the comparator to provide a control signal for a servo relief valve. The servo relief valve provides a variable restriction between a flow line and a fluid reservoir surrounding the plates and discs. The flow line is connected between a source of pressurized fluid and the actuating piston, and the pressure therein is varied by the valve in response to the control signal to control the speed of the output shaft. The discharge from the servo valve is directed to the first and second series of discs and plates, respectively, whereby to maintain viscous shear and also to transfer the heat generated by friction.

28 Claims, 5 Drawing Figures

CONTROL SYSTEM FOR VARIABLE SPEED DRIVE

BACKGROUND AND SUMMARY OF THE INVENTION

The present invention provides a control system for a variable speed drive unit which is capable of determining the magnitude and sense of difference between the actual speed of an output shaft of the drive and a desired speed during a very small increment of rotation of the output shaft, and additionally, one which is capable of quickly adjusting the speed of the output shaft to reduce the difference. The control system of this invention uses a sensor which provides a pulse train with each pulse of the train being representative of preselected small increment of rotation of the output shaft of the drive. The control system determines whether the time interval between successive pulses is greater or smaller than a time interval representative of the desired speed. In the preferred control system, each pulse from the sensor is delayed by a digital delay circuit for the time interval representative of the desired speed, and each delayed pulse is compared in time with the next pulse from the sensor by a comparator. The comparator provides an output signal which preferably comprises a train of pulses with each pulse having a width representative of the difference in arrival time of compared pulses and a polarity indicating which pulse arrived first. The output signal of the comparator is integrated to yield an analog signal representative of the magnitude and sense of the error, i.e. the difference between the actual speed of the output shaft of the drive and the desired speed, which is ultimately used to control the speed of the drive. In the preferred system, a servo relief valve receives the error signal and in response thereto controls the magnitude of pressure applied to an actuating piston and correspondingly the clamping force applied to a disc stack whereby the speed of the output shaft is controlled.

The design of the servo valve of this invention advantageously permits the full capability of the electronics to be transferred to the mechanical portion of the complete system. Reliability is also achieved. Conventional servo valves usually include lapped sliding spools and small orifices that have been found to be very intolerant of oil contamination. The servo valve of the subject invention, on the other hand, is of exceptionally simple construction and is just as tolerant of dirt as the ordinary direct acting spring loaded relief valve. Generally speaking, the valve is comprised of a relatively small fluid passage having a first end in fluid communication with a pressurized fluid source and an opposite end terminating at a flat surface at a right angle to the passage. The opposite end is covered by a small flat flapper plate suitably guided for reciprocal movement relative to the flat surface and biased by a light coil spring to a generally open position. In response to a control signal from the electronics, a small coil applies an opposing force on the flapper plate tending to close the passage which increases the pressure to the actuating piston. This pressure is substantially proportional to the magnitude of the output signal and controls the clamping force applied to the disc stack via the actuating piston. As shall be appreciated, hydraulic fluid is always flowing between the flat surface and the plate to provide a self-cleaning advantage. An additional advantage resides in the fact that since the servo valve is a relief valve, the requirement for additional relief valves or other overpressure protection devices is obviated.

In another aspect of the subject invention, it will be noted that the servo relief valve may be used directly with certain variable speed drive units of a size wherein the volumetric requirements of hydraulic fluid are equated to the volumetric capacity of the valve. In variable speed drive units having a hydraulic volumetric requirement in excess of the capacity of the valve, the valve may be utilized as a pilot loader for a hydraulically actuated relief valve and be responsive to identical electronics as previously described.

In yet another aspect of a control system for a variable speed drive unit, initially starting high inertia loads coupled to the output shaft have been found to be a problem. In the conventional application, the high inertia load is accelerated from a generally static condition through a time interval until the load has achieved the angular velocity of the input shaft. For such applications the servo control system can be programmed to provide a speed signal ramp as a function of time. In applications which do not have high break-away torque relative to the accelerating torque requirements, smooth acceleration can be achieved by programming acceleration torque as a function of time. For such applications the control system can be replaced by a combination relief and acceleration valve which is responsive to an adjustable setting of a needle valve. After acceleration is achieved, the disc stacks are engaged or "locked up" and the driven machine runs at exactly the speed of the driver. As will be appreciated, no slip is required to transmit torque and therefore no heat is generated.

Other features and advantages of the present invention will become apparent from the following detailed description, taken in conjunction with the accompanying drawings.

DETAILED DESCRIPTION OF THE PREFERRED EMBODIMENTS

Figures 1, 2:
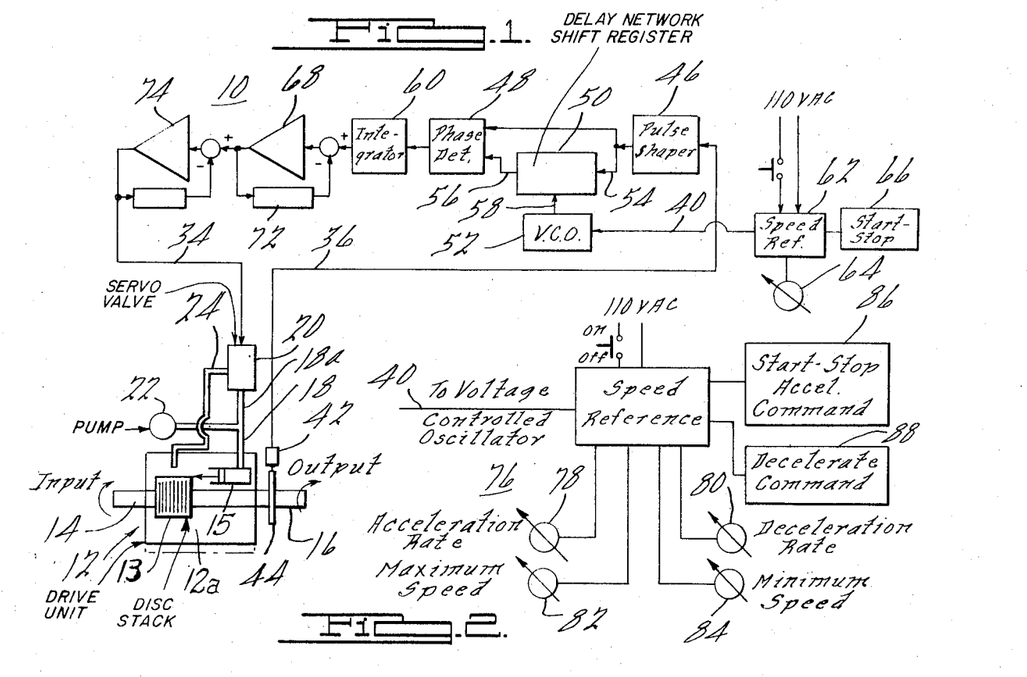
FIG. 1 is a schematic block diagram of the preferred control system of the subject invention including a block representation of an exemplary variable speed drive unit.
FIG. 2 is a schematic block diagram of an acceleration-deceleration control system for optional use instead of the control system illustrated in FIG. 1.

In FIG. 1, a control system 10 is illustrated for a variable speed drive unit 12 having an input shaft 14 and an output shaft 16. The variable speed drive 12 varies the rotational speed of the output shaft 16 relative to the speed of the input shaft 14 in accordance with a fluid pressure signal on a fluid line 18. In this regard, representative variable speed drives may be found in copending application of Gordon M. Sommer entitled "Variable Speed Drive", Ser. Nos. 291,216 and 291,217, now Pat. No. 3,800,930 and assigned to the same assignee as the assignee of this application and filed on the same day as this application. The teachings of each of the aforementioned applications are incorporated herein by reference thereto.

As will be apparent from the aforementioned applications, and as shown schematically in FIG. 1, the variable speed drive unit 12 includes a disc stack 13 comprised of a plurality of opposed discs and plates supported respectively for rotation with the input shaft 14 and the output shaft 16. The discs and plates are located in a fluid reservoir 12a defined by the housing of the unit 12 and are at least partially submerged therein so as to transfer the torque of the input shaft 14 via engagement of the discs and plates on a viscous shear principle. The degree of transfer of motion between the shafts is controlled by the application of pressure across the discs and plates tending to bring the discs and plates together. This pressure is preferably applied by a movable wall device such as a piston and cylinder combination 15. The piston is connected to a pump 22 by the flow line 18 so as to be acted on by fluid pressure to control the transfer of torque between the input shaft 14 and the output shaft 16. The fluid pressure in the fluid line 18 is controlled by a servo relief valve 20 which provides a variable restriction in a fluid flow path connecting the fluid pump 22 to the fluid reservoir surrounding disc stack 13 contained with the unit 12. The reservoir may also serve as a source of fluid for the pump 22 and is schematically illustrated in FIG. 1 in fluid communication with the valve 20 via a flow line 24 which is arranged to discharge fluid onto disc stack 13 with the fluid subsequently collecting in reservoir 12a where it can be cooled before being again sucked up by pump 22 for recirculation through the hydraulic system. Generally speaking, the degree of restriction provided by the servo relief valve 20, is a function of an electrical signal on an output conductor 34 of the control system 10 so as to control the transfer of torque between the input shaft 14 via the discs and plates to the output shaft 16.

The control system 10 is responsive to an output shaft speed signal on line 36 and a command speed signal on line 40. The output shaft speed signal on line 36 is obtained from a speed sensor comprising a magnetic pick-up 42 and a toothed gear 44. The toothed gear 44 provides a variable reluctance path for the magnetic pick-up to provide a pulsating signal with each pulse of the signal being representative of the passage of one tooth by the magnetic pick-up 42. Therefore, each pulse on line 36 represents an increment of rotational displacement of the output shaft 16 and the rate of repetition of the pulses represents the speed of the output shaft 16.

The pulses on line 36 are received by a pulse shaper 46 which provides well-defined output pulses. The pulses from the pulse shaper 46 are directly received by a phase detector 48 at one input terminal thereof and are also directly received by a delay network 50 at input terminal 54. The delay network 50 is, in effect, a digital delay line which is responsive to a voltage controlled oscillator 52. For example, the delay network 50 may be a shift register which is adapted to shift the pulses received at the input terminal 54 through one stage of the shift register towards an output terminal 56 for each clock pulse received from a line 58. Clock pulses on line 58 are provided by the voltage controlled oscillator 52 so that the voltage controlled oscillator 52 controls the transfer of the pulses received from the pulse shaper 46 through the stages of the delay network 50 to the output line 56.

The frequency of the voltage controlled oscillator 52 is established to be equal to the number of stages of the shift register times the frequency of the signal on line 36 representative of desired output shaft speed. In one example, the delay network 50 was a shift register having 64 stages which was used in combination with a 192 tooth gear 44 so that 64 times the desired output shaft speed signal in pulses per minute which in turn is 192 times the desired output shaft revolutions per minute is the appropriate oscillator frequency. Thus, in that example, the appropriate oscillator frequency for an output shaft speed of 100 revolutions per minute would be 64 × 192 × 100 = 1,228,800 pulses per minute. Under the above conditions, if the speed of the output shaft is the same as the desired speed, the pulse from the delay network 50 on line 56 will arrive at the phase detector 48 at the same time as the next pulse in sequence from the pulse shaper 46. When the pulses from the delay network 50 and the pulse shaper 46 arrive at the phase detector 48 at the same time, indicating that the output shaft 16 is rotating at the desired speed, the phase detector provides a zero output signal to an integrator 60. If the puse from the delay network 50 arrives at the phase detector 48 prior to the pulse from the pulse shaper 46, indicating that the output shaft is rotating slower than the desired speed, the phase detector 48 will provide an output signal having a width representative of the difference in arrival time and one polarity, e.g. negative, representing that the speed of the output shaft 16 is less than the desired speed. If, on the other hand, the pulse from the pulse shaper 46 arrives at the phase detector 48 prior to the pulse from the delay network 50, indicating that the output shaft 16 is rotating faster than the desired speed, the phase detector will provide an output signal again having a width representative of the difference in arrival time but having an opposite polarity, e.g. positive, representing that the speed of the output shaft 16 is greater than the desired speed.

Although a delay network which comprises a shift register with 64 stages has been found satisfactory, shift registers having more or fewer stages can be used. An increased number of stages in the delay network 50 will increase the resolution of the control system 10 while a fewer number of stages in the delay network 50 will decrease the resolution of the control system 10.

The voltage-controlled oscillator 52 receives the signal on line 40 representative of the desired speed which is in the form of a DC control voltage. The DC control voltage is generated at a speed reference circuit 62 which may be a DC voltage source which is variable by adjustment of a control 64 and which is effective to establish the frequency of the voltage controlled oscillator output signal on line 58. Preferably, the DC voltage generator 62 is powered by a standard AC source as shown. The DC control voltage can be initiated or terminated by a start-stop command control 66.

The integrator 60 receives the signals from the phase detector 48 representative of the delay or advance of the pulse from the pulse shaper 46 relative to the pulse from the delay network 50. As previously stated, the phase detector 48 produces pulses having widths or durations representative of, and preferably proportional to, the time difference between the arrival of the pulses from the pulse shaper 46 and the delay network 50 and a polarity representative of whether the pulse from the pulse shaper 46 is leading or lagging the pulse from the delay network 50. The integrator 60 provides an output signal which is a DC voltage proportional to the error, i.e., the sum of the duration of the pulses from the phase detector 48 of one polarity minus the sum of the duration of the pulses from the phase detector 48 of opposite polarity, The output of the integrator is received by a stabilization amplifier 68. The stabilization amplifier 68 is provided with a stabilization network 72 which feeds back an appropriate modified portion of the output of the stabilization amplifier 68 to provide appropriate damping and anti-hunt characteristics. The output of the stabilization amplifier 68 is received by a servo valve power amplifier 74 which is essentially a voltage-to-current converter whereby the current output of the servo valve power amplifier 74 will be representative of the voltage output of the stabilization amplifier 68. The output of the servo valve power amplifier 74 is delivered to the control line 34 which in turn is connected to the servo relief valve 20 as previously described.

In essence, as will be appreciated in view of the detailed description hereinafter, the control signal on line 34 is effective to adjustably close the servo relief valve 20 in accordance with the magnitude of the error signal from the integrator 60. By way of illustration, when one or more pulses from the pulse shaper 46 arrive at the phase detector 48 after the compared pulses from the delay netWork 50, the servo relief valve 20 is proportionally closed to increasingly restrict the flow of fluid therethrough to thereby increase the pressure on the discs and to increase the speed of the output shaft 16. If one or more of the pulses from the pulse shaper 46 arrive at the phase detector 48 prior to the compared pulses from the delay network 50, the servo relief valve 20 is correspondingly opened to reduce the pressure at the control line 18 thereby reducing the pressure between the discs of the variable speed drive 12, and accordingly, reducing the speed of the output shaft 16.

From the above, it will be appreciated that a comparison is made between the speed of the output shaft and the desired speed indicated by the speed reference circuit 62 on each passage of a tooth of the gear 44 by the magnetic pick-up 42. Consequently, in the present embodiment, the speed of the output shaft 16 is compared to the desired speed 192 times during each revolution of the output shaft 16.

Optionally, the voltage controlled oscillator 52 may be programmed by a control 76 which is effective to control the rotational acceleration, the maximum speed, the rotational deceleration, the minimum speed, and the stoppage of the output shaft 16. To this end, the unit 12 is provided with either an integral brake disc stack or an auxiliary brake either of which may be controlled by the system 76, and the control system 76 is provided with an acceleration rate control 78, a deceleration rate control 80, a maximum speed control 82, a minimum speed control 84, a start-stop acceleration command control 86, and a deceleration command control 88. For example, the acceleration rate and deceleration controls may be operatively associated with an integrator and first and second voltage sources. More particularly, the integrator may be connected ro receive a potential of positive polarity from the first voltage source so as to integrate that potential thereby yielding an increasing ramp signal on the output line 40 of the control 76 representing a desired increase in speed. The second voltage source may provide a signal having a negative polarity to the integrator so as to result in decreasing ramp signal on the line 40 of the control 76 representing a desired decrease in speed. The rate of increase or decrease of the ramp signal is a function of the magnitude of the voltages from the first and second voltage sources and are set by the acceleration rate control 78 and the deceleration rate control 80, respectively. The minimum and maximum speed circuits are preferably variable voltage clamping circuits responsive to minimum and maximum speed controls and for establishing the minimum and maximum voltages on output line 40, and hence, minimum and maximum sources, respectively. The acceleration and deceleration rates and the periods of minimum and maximum speed can be programmed as a function of a machine cycle. For example, a punch press is preferably operated during certain portions of its cycle at slow speed and, in other portions of the cycle, the press is preferably operated at high speed. More particularly, the control 76 can be programmed to rotate the input shaft of the punch press at a rate in accordance with the setting of the maximum speed control 82 during a first portion of the operating cycle of the press. During a second portion of the cycle the press can be decelerated at a rate in accordance with the setting of the deceleration control 80 to a minimum speed established by the minimum speed control 84. The press can then be accelerated at a rate in accordance with the setting of the acceleration control 80 to the maximum speed as established by the control 82 and thereafter the press can be stopped to complete the operating cycle.

Figure 3:
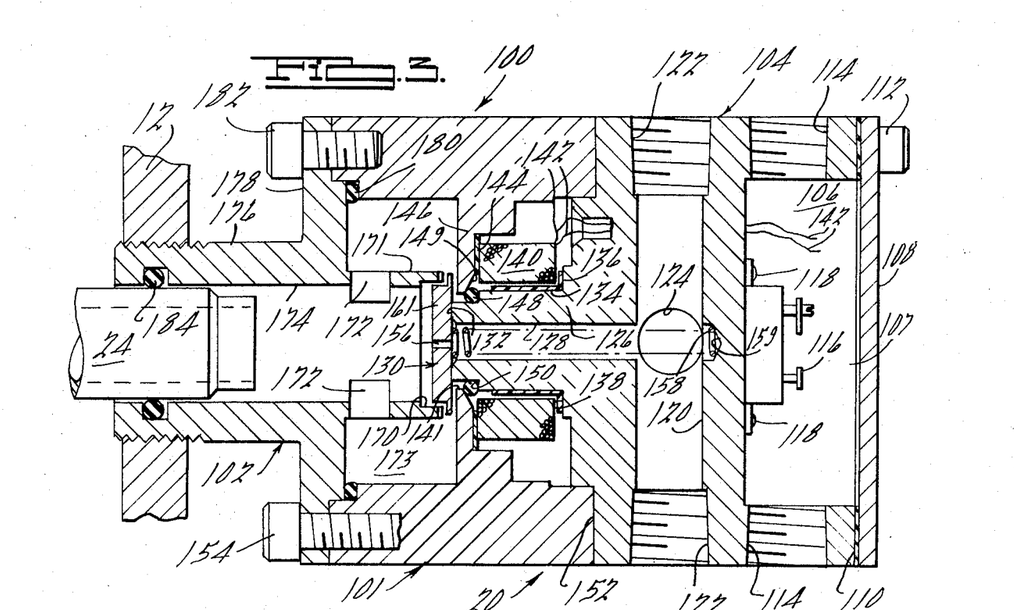
FIG. 3 is a sectional elevation of a servo relief valve of the subject invention which is responsive to the control system of FIG. 1.

In the subject invention and as previously indicated, the clamping pressure applied to the discs by the actuating piston is controlled by the servo relief valve 20 in response to the control system output signal on line 34. In FIG. 3 the servo relief valve 20 is illustrated in mounted relationship with a fragmentary portion of the drive unit 12. For purposes of clarity and definition, the terms "upper" and "lower" shall hereinafter have reference to the right and left ends respectively of the valve 20 as oriented in FIG. 3, with the fragmentary section of the housing illustrated therewith representing a generally upper horizontally disposed section or valve mounting portion. Moreover, the terms "inward" and "outward" shall have reference to the geometric center of the valve 20 as illustrated therein.

Generally speaking, the servo relief valve 20 is comprised of a three section housing assembly 100, a flapper plate 130 adapted for reciprocal movement therein, and a solenoid actuator or coil 140 adapted to apply a force on the plate 130. The assembly 100 includes a lower housing member 101 located between a mounting adapter member 102 and an upper housing member 104. A terminal box 106 is formed in the upper end of the member 104 and includes an access opening 107. A cover plate 108 is removably connected to an upper face of the member 104 via a suitable gasket means 110 and a plurality of spaced bolts, screws, or the like 112. In the subject invention, the electrical leads extending between the control module 10 and the valve 20 are preferably encased in a suitable conduit. In this regard, the box 106 includes one or more apertures 114 for threadably receiving a suitable conduit fitting (not shown). A thermal switch 116 is disposed in the box 106 and connected to an inner wall by suitable bolts, screws, or the like 118. The switch 116 measures the temperature of the hydraulic fluid flowing through the valve 20 and is connected in series with the solenoid actuator 140 and the conductor 34 of the control system 10. The switch 116 provides an automatic thermal cutout when the fluid temperature exceeds a preselected magnitude whereby to release the clamping pressure on the disc stack and release the torque applied to the output shaft 16.

The valve 20 is in fluid communication with the discharge side of the pump 22 via the conduit 18a (FIG. 1) connected to a threaded end section 122 of one of a pair of fluid passages 120 and 124. The passages 120 and 124 are oriented in criss cross, right angle relationship and the remaining outer end sections 122 are closed by threaded plugs (also not shown). The member 104 also includes a downwardly extending, cylindrically shaped section 126 having a flat, annularly shaped surface 132 at a lower end and including a coaxially extending passage 126 having an upper end centrally intersecting the passages 120 and 124. A tubular shaped electrical insulating element 134 having an outward radially extending flange section 136 is carried on an outer peripheral surface of the section 126 with the flange 136 being located against a radially extending shoulder 138. The solenoid actuator or coil 140 is disposed on an outer peripheral surface of the insulating element 134 and a pair of electrical leads 142 therefrom are located in a passage 143 and are connected to the thermal switch 116.

The lower end of the coil 140 is supported on an inward radially extending, flange section 146 of the member 101, the section 146 including an inward, centrally located aperture 141 which is engaged by the lower end of the section 126 of the member 104. An annular shaped insulating washer 144 is located between the section 146 and the coil 140. The coil 140 is fluidly sealed by an O-ring 148 located on an inclined, annularly shaped, surface 149 located proximate the aperture 141 and a radially extending shoulder formed on the section 126. The O-ring 148 is compressed therebetween through the assembly of the members 101 and 104, the former having an upper end portion located in a complementary shoulder 152 of the latter and connected therewith via a plurality of circumferentially spaced bolts, screws, or the like 154, which also extend through the member 102.

The flapper plate 130 includes a centrally located bleed hole 156 and is biased to a generally open position relative to the surface 132 by a coil spring 158 located in the passage 128. The upper end of the spring 158 is disposed in a cup-shaped recess 159 formed by an upper projection of the passage 128 and the lower end abuts the upper surface of the plate 130. The plate 130 has a downwardly extending cylindrically shaped section 161 slidably located in an enlarged counterbore 170 of an upwardly extending plate seating section 171. The outer peripheral surface of the section 171 defines an annular shaped fluid passage 173 with the inner peripheral surface of the member 101. The passage 173 receives hydraulic fluid transferred between the plate 130 and the flat surface 132 and transfers the fluid to an inner bore 174 of the adapter 176 via a plurality of radially extending openings 172 formed in the side wall of the section 171.

The member 102 is adapted to be connected to the variable speed drive 12 by threads disposed on the lower end of a tubular section 176 thereof. The member 102 also includes an outward, radially extending, flange section 178 which is connected via a suitable O-ring or sealing member 180 to the lower end of the member 101 via suitable bolts, screws, or the like 182. The bolts 182 are alternately circumferentially spaced with the bolts 154 and permit the end housing member 104 to be separately removed for inspection of the flapper plate 130 without disturbing the installation of the mounting adapter member 102 and housing member 100. A pipe nipple or conduit, indicated generally at 24 in acordance with FIG. 1 is sealingly engaged to the inner periphery of the bore 174 and fluidly sealed via O-ring member 184, so as to define a fluid path for the transfer of hydraulic fluid from the valve 20 to the disc stack of the drive unit 12.

In operation, the pump 22 supplies hydraulic fluid directly to the actuation piston via the flow line 18 and the branch flow line 18a which is connected to one of the sections 122. The pressure in the conduit 18 is determined by the force applied by the coil 140 on the flapper plate 130 urging it against the flat surface 132. Assuming initially that the electronics provides no output signal, the flapper plate 130 is biased to an open position relative to the flat surface 132 with the result that no clamping pressure is applied to the discs and plates. In response to an output signal, however, the flapper plate 130 is urged toward the flat surface 132 providing a variable restriction to fluid flow in the passage 126 in accordance with the magnitude of the force field of the coil 140 to increase the pressure upstream of the plate 130. This increased pressure is applied to the actuating piston of the unit 12 to provide a clamping force on the discs and plates whereby to transmit torque between the input shaft 14 and the output shaft 16. Increasing the force field of the coil 142 in response to an increase in the magnitude of the output signal increases the clamping pressure and results in increasing the torque to the output shaft. Correspondingly, reducing the magnitude of the control signal has a reverse effect. It will be noted that the actuating piston of the drive unit 12 is generally analogous in the above described system to a dead ended section of pipe due to the absence of flow thereacross. Moreover, it will be seen that the entire output of the pump 22 is transferred across the fluid passage 128 and between the flapper plate 130 and flat surface 132 with the exception of a minimal volume of fluid being transferred via the bleed hole 156. Due to the fact that hydraulic fluid is always flowing across the flat surface, a self-cleaning action is provided which makes the valve 20 very tolerant of dirt. Moreover, because the valve 20 is a relief valve, the need for additional relief or other over-pressure, protection devices is obviated.

Figure 4:
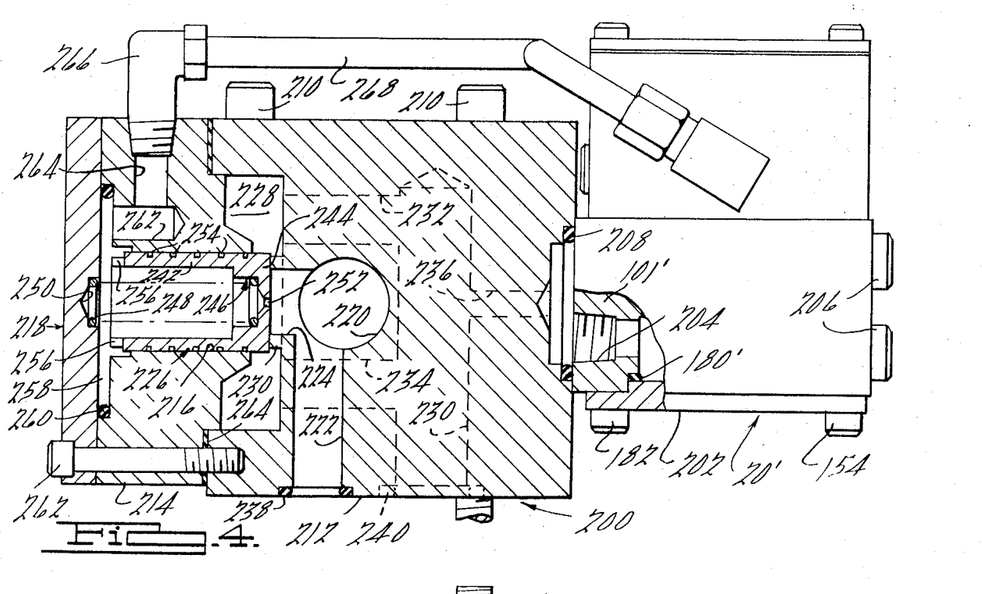
FIG. 4 is a sectional elevation of a hydraulically actuated relief valve and a side elevational view of the valve illustrated in FIG. 3 with a portion broken away to depict a pilot loader application therefor.

As indicated above, the entire volume of hydraulic fluid discharged by the pump 22 is transferred across the passage 128 of the valve 20 to maintain a viscous shear and also to transfer the heat generated by friction. In applications of variable speed drive units where the volume of hydraulic fluid for heat transfer requirements exceed the capacity of the valve 20, the valve 20 may be utilized as a pilot loader to control a hydraulically actuated relief valve having an increased volumetric capacity. In FIG. 4, a slightly modified servo relief valve 20' is illustrated as operatively connected to the right end of a hydraulically actuated relief valve 200. For purposes of clarity, identical components, members, and elements are indicated with the same numeral used in conjunction with FIG. 3 but with the addition of a prime (') suffix. In the valve 20', a lower cover plate 202 is substituted for the mounting adapter member 102, and is secured to the member 101 in an identical manner by the circumferentially spaced sets of bolts, screws, or the like 182' and 154' and fluidly sealed by the gasket 180'. In the embodiment of FIG. 4, however, the discharge flow is transferred to the valve 200 via a suitable fluid passage 204 formed in a side wall of the member 101'. The valve 20' is sealingly connected to the right end of the valve 200 via an O-ring gasket 208 and suitable bolts, screws, or the like 206. Correspondingly, the valve 200 is mounted to the variable speed drive unit 12 by a plurality of bolts, screws, or the like 210. Reference may be had to the copending patent application of Gordon M. Sommer, Ser. No. 291,217 filed Sept. 22, 1972, previously incorporated in this application by reference, and which provides an exemplary illustration of a preferred mounting arrangement for the valve 200 relative to the drive unit 12.

Generally speaking, the valve 200 is comprised of a housing member 212, having an end surface connected to the pilot valve 20', an end housing 214 having a cylindrical passage 216 and connected to an opposite surface of the member 212, a spring loaded piston 226 located in the passage 216 and hydraulically actuated by the valve 20' to control the pressure applied to the actuating piston of the drive unit 12. The member 212 includes a laterally extending passage 220 having threaded sections at opposite outer ends thereof. One of the threaded sections is connected to a source of pressurized fluid, such as the pump 22, via suitable piping or conduit (not shown) with the other threaded section being closed by a threaded plug (not shown). The passage 220 is in fluid communication with both the actuating piston of the drive unit 12 via a downwardly extending, fluid passage 222, and with an end surface of the piston member 226 via a passage 224. An annular shaped piston seat 230 is formed at the left end of the passage 224 and confronts the end surface of the piston 226 to define a variable restriction therewith, the purpose of which shall hereinafter be explained. The member 212 also includes an enlarged cylindrically shaped recess 228 which is coaxial with the passage 224 and piston seat 230 and is in fluid communication with the disc stack via a pair of vertically spaced passages 232 and 234, respectively, and a downwardly extending fluid passage 230. The passage 230 is also in fluid communication with the fluid passage 204 of the servo relief valve 20' via a fluid passage 236. Both of the vertically extending passages 222 and 230 are fluidly sealed relative to the drive unit 12 by O-ring gasket means 238 and 240 respectively.

The piston member 226 is of generally cupped shaped configuration and includes a tubular skirt section 242 which extends from the outer periphery of an end section 244. The inward or right end of the section 244 includes a cylindrically shaped recess 246 which supports one end of a coil spring 248, the opposite end being located in a circular recess 250 formed on an inner face of a cover plate 218. The spring 248 functions to bias the piston member 226 to the right against the annular seat 230 to apply a preselected pressure against the actuating piston as shall also be hereinafter explained. The interior of the skirt section 242 is in fluid communication with the inlet fluid passage 220 via a bleed hole 252 and the outer periphery of the piston 226 is fluidly sealed relative to the passage 216 by a plurality of axially spaced, circumferentially extending grooves 254, the grooves 254 defining a labyrinth sealing section therefor. The lower end of the skirt section 242 includes a plurality of circumferentially spaced openings 256 for communicating pressurized fluid from the interior of the skirt section 242 to a generally enlarged, relatively shallow recess 258, the recess 258 also carrying a suitable gasket means 260 for fluidly sealing the housing 214 and the cover plate 218. The cover plate 218 and the members 212 and 214 are connected together via a plurality of suitable bolts, screws, or the like 262, and the members 214 and 212 are fluidly sealed via a gasket means 264. Hydraulic fluid located in the recess 258 is in fluid communication with the inlet passage 124 of the servo relief valve 20' via fluid passages 262 and 264 formed in the member 214 and a conduit assembly comprising conduit fittings 266 and 270 and a conduit 268.

Generally speaking, the valve 200 is controlled by the valve 20' by pilot loading the piston member 244 in response to the control system output signal on line 34 so as to permit the member 244 to function as a variable restriction in the flow line 18 between the pump 22 and the actuating piston of the drive unit 12. Assume initially that the actuating piston which applies the clamping pressure to the disc stack is biased to a non-clamping position via a plurality of return springs acting on one side of the actuating piston and supported by the unit 12. The opposite side of the actuating piston is in fluid communication with the discharge side of the pump 22 via the passages 220 and 222 of the valve 200. In the absence of a control signal from the electronics, a preselected fluid pressure is maintained against the actuating piston to provide a force of less magnitude in opposition to the return springs. In the valve 200, the spring force applied against the piston member 216 provides the preselected pressure level. Note that the member 226 is biased to a closed position relative to the piston seat 230 by the coil spring 248. Through preselection of the spring force, a predetermined pressure is maintained in the passages 220, 222 and 224 and correspondingly against the actuating piston of the drive unit 12. Also it will be noted that fluid transferred through the bleed hole 252 is discharged by the valve 20' by virtue of the fact that the flapper plate 130 (see FIG. 3) is open relative to the flat surface in the absence of a control signal. In response to a control signal on line 34, however, the flapper plate 130 is drawn towards the surface 132 by the electromagnetic force provided by the coil 140 to increase the pressure in the passage 128 and correspondingly the pressure on the left side of the piston member 226. Correspondingly, an increase of pressure on the left side of the piston member 226 supplements the spring force to increase the pressure on the right side of the member 226 whereby to apply a greater force on the actuating piston for clampingly engaging the disc stack. Since the pressure on the left side of the piston member is determined by the valve 20' in response to the control signal, the operation of the valve 200 is dictated by the operation of valve 20'. Because of the enlarged volumetric capacity of valve 200 relative to the valve 20', a much greater volume of hydraulic fluid can be provided to the unit 12 for cooling the disc stack.

Variable speed drive units described in the copending applictions are also used in applications with a driven equipment at the same speed as the motor. But the difficulty arises in accelerating the equipment from a generally stationary condition to the angular velocity of the constant speed drive unit. In applications involving high static friction wherein high torque is required to first start the equipment moving, such as is encountered in large conveyor systems, the control system 10 with the acceleration and valves 20' and 200 are used since the acceleration module provides a speed signal ramp as a function of time. The torque of the variable speed unit will be very high at break-away and then automatically be reduced to smoothly accelerate the driven machine to full motor speed. Other types of equipment as, for example, ball and rod mills, hammer mills, fans, pumps or the like generally do not have high break-away torque requirements relative to the accelerating torque requirement, and smooth acceleration can be achieved by programming accelerating torque as a function of time. For such applications the control system 10 and the valves 20 or 20' and 200 can be replaced by a combination relief and acceleration valve.

Figure 5:
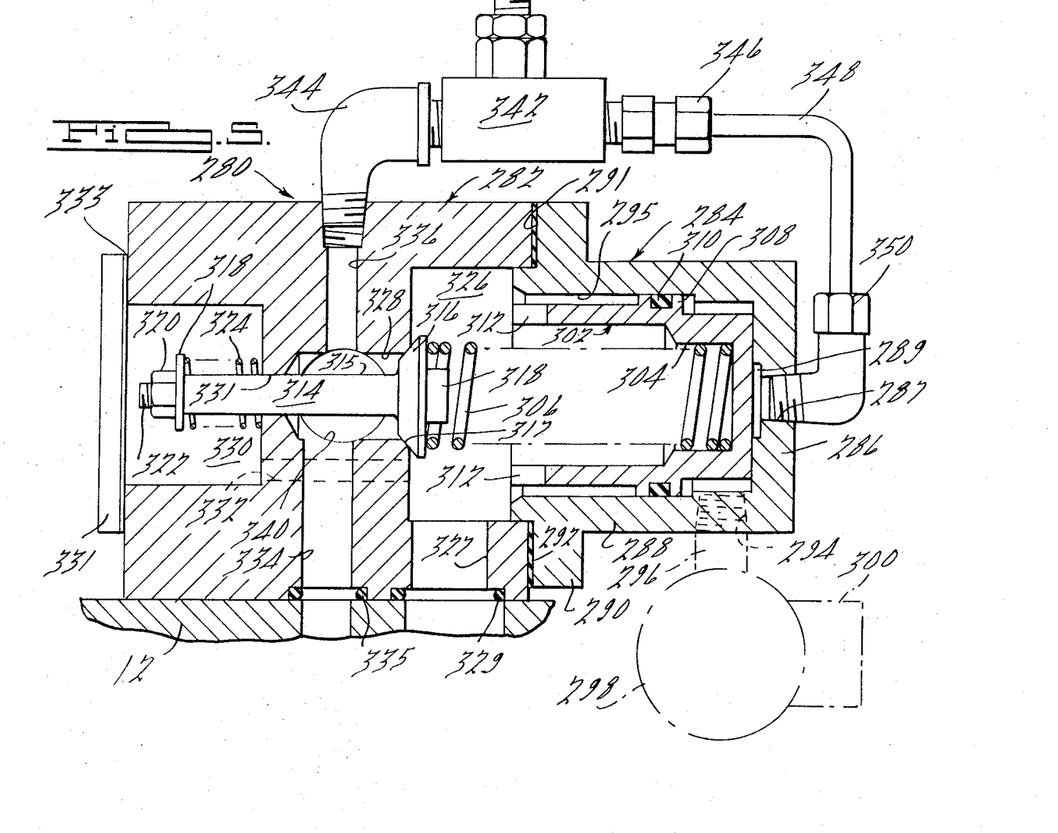
FIG. 5 is a sectional elevation of a combination relief and acceleration valve also utilized to control a variable speed drive unit.

In FIG. 5 a combination relief and acceleration valve, in accordance with the subject invention, is indicated generally at 280. The valve 280 is comprised generally of a main housing member 282 and an end housing 284. The end housing member 284 is of generally cylindrical shape and includes a radially extending end wall 286 having a centrally located threaded bore 287, the bore 287 being adapted to receive the threaded male end of a fluid conduit fitting 350. The inward end of the bore 287 has a diametrically enlarged counterbore 289 which confronts an outer end surface of a piston member 302. The member 284 also includes a tubular shaped skirt section 288 which extends to the left as viewed in FIG. 5 from the outer periphery of the wall 286. A radially enlarged flange 290 is located at the left end of the section 288, and forms an annular shaped shoulder 291 which is adapted to cooperatively receive the right end of the main housing member 282. The members 282 and 284 are connected via a gasket means 292 and a set of circumferentially spaced bolts, screws, or the like (not shown). The piston member 302 has a radially enlarged flange section 308 which is slidably located in a cylinder 295 formed by the inner periphery of the member 284. An O-ring 310 is located in the outer periphery of the section 308 and fluidly seals opposite axial ends of the member 302. The piston 302 is biased to the right end of the clyinder 295 by a coil spring 306 having an end portion located in a cylindrically shaped recess 304 formed at the right end of the member 302, and an opposite end portion guidably supported on an embossment 318. The embossment projects outwardly from a radially enlarged valve section 316 of a plunger member 314. As the piston 302 is urged to the left, as shall hereinafter be described, the spring provides a bias on the plunger 314 tending to close a fluid passage 328. Fluid communication between the inner periphery and outer periphery to the left of the flange 308 is maintained by a plurality of circumferentially spaced slots 312, located on the left end of the member 302.

The right end of the cylinder 295 includes a tapped opening 294 which is connected to a solenoid valve 298 vai a conduit 296, the outlet side of the valve 298 being preferably connected to a suitable fluid reservoir in fluid communication with the suction side of the pump 22. The solenoid valve 298 is normally open and closes in response to a "start" command signal for the drive unit 12 and as will be hereinafter described in conjunction with the operation of the valve 280 and the drive unit 12.

The housing member 282 includes a laterally extending inlet passage 340 having threaded outer end sections (not shown). ONe of the end sections is connected to the discharge side of the pump 22 and the opposite end section may be suitably closed by a threaded plug. The inlet passage 340 is in fluid communication with the right end of the cylinder 295 by an upwardly extending fluid passage 336, a threaded elbow 344, a needle valve 342, and section of conduit and conduit fittings 348 and 346, respectively. The needle valve 342 provides an adjustable variable restriction which predetermines the rate of hydraulically pressurizing or loading the right end of the cylinder 295, and correspondingly the rate of movement of the piston 302, to the left against the bias of the spring 306.

The inlet passage 340 is also in fluid communication with the actuating piston of the drive unit 12 via a downwardly extending passage 334 which is sealed at its lower end relative to the mounting surface of the unit 12 by an O-ring 335. The central, longitudinally extending passage 328 is also in fluid communication with the passages 340, 334, and 336 and the right end thereof forms an inclined annular shaped surface 317 which forms a valve seat for a complementary tapered surface formed on the opposing end of the valve section 316. The enlarged cylindrical passage 326 is disposed in the right end of the member 282 coaxially with the plunger 314 and passage 328 and is in fluid communication with the disc stack of the drive unit 12 via a downwardly extending passage 327. The lower outer end of passage 327 is also fluidly sealed relative to the mounting surface of the drive unit 12 by an O-ring 329. The left end of the member 282 also includes an enlarged, cylindrically shaped, recess 330 having a passage 331 extending between the inward wall thereof and the passage 328. A spool section 315 of the plunger 314 is slidably located therein and biased to the left by a relatively light spring 324 to seat the valve 316. The spring 324 is coaxially located about the stem 315 and has a first end abutting the inward surface of the recess 330, and an opposite end retained thereon by a washer 318 and a threaded fastener 320. The outer end of the recess 330 is closed by a cover plate 331 and is removably connected to the left outer face of the member 282 by a gasket 333 and a set of suitable bolts, screws, or the like (not shown). To provide for leakage of hydraulic fluid between the stem section 315 and the passage 331, a fluid passage 332 interconnects the recess 330 with the recess 326.

The function of the spring 324 is to normally seat the enlarged valve section 316 of the plunger 314 in a closed position relative to the passage 340 to initially preload the actuating piston in opposition to the plurality of actuating piston springs which bias the actuating piston to a "failsafe" or disengaged clutch condition. In this regard, the function is analogous to the spring 248 described above in conjunction with the hydraulically actuated valve 200 illustrated in FIG. 4.

In operation, assume the inlet passage 340 of the valve 280 is connected to a source of pressurized hydraulic fluid such as the pump 22 and the needle valve 342 is preset in a preselected throttled position. Due to the bias of the spring 324 acting on the plunger 314, the actuating piston of the drive unit 12 will be initially pressurized to partially overcome the bias of the actuating piston springs. Subsequently the volumetric discharge from the pump 22 will be transferred across the valve section 316 and valve seat 317 to the disk stack via the passage 327. Simultaneously, pressurized hydraulic fluid entering the passage 336 will be transferred across the needle valve 342 to the right end of the cylinder 295 and wherein the fluid will be discharged to the fluid reservoir via the normally opened solenoid valve 298. When it is desired to drivingly connect the driving means to the high inertia load, the solenoid valve 298 is closed via actuation of a start switch. Hydraluic fluid now entering the inlet passage 336 will be throttled across the needle valve 342 to urge the piston member 302 to the left against the bias of the spring 306, the time loading rate being determined by the degree of throttle of the needle valve 342. When the piston member 302 bottoms, i.e. the left annular end thereof engages the left wall of the recess 326, sufficient pressure is maintained on the actuation piston for lockup of the discs and plates and thereby drivingly engage the high inertia load to the drive motor. Should it be desired to either increase or decrease the acceleration rate hereinbefore described, the sequence is easily accomplished by increasing or decreasing the throttle of the needle valve 342. Thus it will be appreciated that the combination relief and acceleration valve obviates the need for a control circuit and other ancillary electronics when it is simply desired to engage a high inertia load adapted to rotate at the constant speed of the driver.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

We claim:

1. A system for adjusting the rotational speed of a rotatable member to approach a desired rotational speed comprising:

sensing means associated with said member for providing a sensing means train of pulses, each pulse of said sensing means train of pulses being representative of a predetermined increment of rotation of said member;

delay means receiving said sensing means train of pulses as an input thereof and providing a delay means train of output pulses as an output thereof;

speed reference means for providing a speed reference signal representative of the desired rotational speed of said member and for supplying said speed reference signal to said delay means;

said delay means comprising means for causing each pulse of said delay means train of pulses to be delayed correlative to a corresponding pulse received from said sensing means for a delay period whose duration is inversely proportional to the desired rotational speed of said member over a range of desired rotational speeds;

comparing means receiving said sensing means train of pulses and said delay means train of pulses for providing an output signal representative of the time interval between the receipt of respective pairs of said pulses of said delay means train of pulses and said sensing means train of pulses, each of said respective pair of said pulses of said delay means train of pulses and of said sensing means train of pulses including one pulse of said delay means train of pulses and a pulse of said sensing means train of pulses which is subsequent to that pulse of said sensing means train of pulses to which one pulse of said delay means train of pulses corresponds; and speed control means associated with said rotatable member for receiving said output signal of said comparing means and for controlling the rotational speed of said rotatable member in accordance with said output signal of said comparing means to cause the actual rotational speed of said rotatable member to approach its desired rotational speed.

2. A system according to claim 1 wherein said respective pairs of pulses each comprises said one pulse of said delay means train of pulses and that one pulse of said sensing means train of pulses which is immediately subsequent to that pulse of said sensing means train of pulses to which said one pulse of said delay means train of pulses corresponds.

3. A system according to claim 2 wherein said delay means delays each pulse of said sensing means train of pulses for a time interval equal to the time interval between successive pulses of said sensing means train of pulses when the actual speed of said rotatable member is equal to said desired rotational speed.

4. A system of claim 1 wherein said comparing means provides a train of pulses with each of said pulses of said comparing means train of pulses being representative of the time interval between the receipt of the pulses of one of said respective pairs of pulses.

5. A system of claim 4 wherein each of said pulses of said comparing means train of pulses has a particular characteristic representative of that pulse of said pulses of said one respective pair of pulses which is first received by said comparing means.

6. A system according to claim 4 wherein each pulse of said comparing means train of pulses has a duration representative of the time interval between receipt by said comparing means of said pulses of said one respective pair of pulses.

7. A system according to claim 6 wherein each pulse of said comparing means train of pulses has either one polarity representing that said pulse of said delay means train of pulses of said respective pair is received by said comparing means prior to said pulse of said sensing means train of pulses of said respective pair or an opposite polarity representing that said pulse of said delay means train of pulses of said respective pair is received after said pulse of said sensing means train of pulses of said respective pair.

8. A system according to claim 7 further including integrating means receiving said comparing means output pulses for providing a signal representative of the sum of said comparing means output pulses of said one polarity minus the sum of said comparing means output pulses of said opposite polarity.

9. A system according to claim 1 wherein said delay means is a digital delay means.

10. A system according to claim 9 wherein said digital delay means is a shift register having a predetermined number of stages which is adapted for moving said correlative pulse through each of said stages at a predetermined rate whereby said correlative pulse is transferred through said shift register in said predetermined time period to provide said delayed pulse.

11. A system for adjusting the rotational speed of a rotatable member to approach a desired rotational speed comprising:
sensing means associated with said member for providing a sensing means train of pulses, each pulse of said sensing means train of pulses being representative of a predetermined increment of rotation of said member;
digital delay means receiving said sensing means train of pulses for providng a delay means train of output pulses, each pulse of said delay means train of pulses being correlative to one pulse received from said sensing means and being delayed relative to said correlative pulse for a predetermined period representative of said desired rotational speed of said rotatable member, said digital delay means including a shift register having a predetermined number of stages which is adapted for moving said correlative pulse through each of said stages at a predetermined rate whereby said correlative pulse is transferred through said shift register in said predetermined time period to provide said delayed pulse;
clock pulse generating means operatively associated with said shift register for providng clock pulses to said shift register, said shift register being adapted so that each clock pulse causes said correlative pulse to transfer one stage of said shift register whereby a predetermined number of clock pulses equal to said predetermined number of stages provides said transfer of said correlative through said shift register wherein said rate of generation of said clock pulses establishes said predetermined time period
comparing means receiving said sensing means train of pulses and said digital delay means train of pulses for providing an output signal representative of the time interval between the receipt of respective pairs of said pulses of said delay means train of pulses and said sensing means train of pulses, each of said respective pairs of said pulses of said delay means train of pulses and said sensing means train of pulses including a pulse of said delay means train of pulses and a pulse of said sensing means train of pulses which is subsequent to said correlative pulse; and
speed control means associated with said rotatable member for receiving said output signal of said comparing means and for controlling the rotational speed of said rotatable member in accordance with said output signal of said comparing means to cause the rotational speed of said rotatable member to approach said desired rotational speed.

12. A system according to claim 11 wherein the rate of generation of said clock pulses by said clock pulse generating means is controlled in accordance with said desired speed.

13. A system according to claim 12 wherein said clock pulse generating means is a voltage controlled oscillator including a terminal adapted to receive a control voltage which establishes the rate of generation of said clock pulses.

14. A system according to claim 13 further including means for providing a signal of adjustable voltage to said voltage controlled oscillator to adjust the rate of generation of said clock pulses by said clock pulse generating means.

15. A system according to claim 14 wherein said means for providing a signal of adjustable voltage provides a signal of increasing voltage for providing a predetermined increase in the rate of generation of said clock pulses and a corresponding increase in said desired speed whereby said rotational speed of said rotatable member will increase in accordance with said increase in said desired rotational speed.

16. A system according to claim 14 wherein said means for providing a signal of adjustable voltage provides a signal of decreasing voltage for providng a predetermined decrease in the rate of generation of said clock pulses and a corresponding decrease in said desired speed whereby said rotational speed of said rotatable member will decrease in accordance with said decrease in said desired rotational speed.

17. A system according to claim 15 wherein said means for providing a signal of adjustable voltage also provides a signal of decreasing voltage for providing a predetermined decrease in the rate of generation of said clock pulses and a corresponding decrease in said desired speed whereby said rotational speed of said rotatable member will decrease in accordance with said decrease in said desired rotational speed.

18. A system for adjusting the rotational speed of an output shaft of a viscous shear variable speed drive comprising:
sensing means associated with said output shaft for providing a sensing means train of pulses, each pulse of said sensing means train of pulses being representative of a predetermined increment of rotation of said output shaft;
speed reference means for providng a speed reference signal representative of the desired rotational speed of said output shaft;
delay means operatively coupled both with said sensing means and with said speed reference means for receiving as respective inputs thereto said sensing means train of pulses and said speed reference signal, said delay means comprising means for causing each pulse of said sensing means train of pulses to be delayed for a delay period whose duration is inversely proportional to the desired rotational speed of said shaft over a range of desired rotational speeds;
comparing means receiving said sensing means train of pulses and the output of said delay means to thereby compare the time interval between sequential ones of said sensing means train of pulses and the time delay imposed by said delay means on the earlier of said sequential pulses and for providing a control signal representative of said comparison; and 19. A system according to claim 18 wherein said comparing means control signal is representative of whether said time interval between sequential ones of said sensing means train of pulses is greater or less than said time interval representative of the desired rotational speed of said output shaft.

20. The system as recited in claim 18 wherein said system further comprises a source of pressurized fluid acting on one side of a piston means to adjust the rotational speed of said output shaft, and wherein said receiving means includes valve means for adjustably regulating the pressure acting on said piston means in response to said control signal.

21. The system as recited in claim 20 wherein said valve means includes a passage having an inlet in fluid communication with said source, a flapper disposed in said passage and defining a variable restriction therewith, and solenoid means responsive to said control signal for modulating said flapper.

22. The system as recited in claim 21 wherein said valve passage has an outlet in fluid communication with said viscous shear drive to discharge fluid thereon thereby to maintain viscous shear.

23. A system for adjusting the rotational speed of a rotatable member to approach a desired rotational speed comprising:
sensing means associated with said member for providing a sensing means train of pulses, each pulse of said sensing means train of pulses being representative of a predetermined increment of rotation of said member;
delay means receiving said sensing means train of pulses for providing a delay means train of output pulses, each pulse of said delay means train of pulses being correlative to one pulse received from said sensing means and being delayed relative to said correlative pulse for a predetermined period representative of said desired rotational speed of said rotatable member;
comparing means receiving said sensing means train of pulses and said delay means train of pulses for providing an output signal representative of the time interval between the receipt of respective pairs of said pulses of said delay means train of pulses and said sensing means train of pulses, each of said respective pairs of said pulses of said delay means train of pulses and said sensing means train of pulses including a pulse of said delay means train of pulses and a pulse of said sensing means train of pulses which is subsequent to said correlative pulse, said output signal comprising a train of pulses with each of said pulses of said comparing means train of pulses being representative of the time interval between the receipt of the pulses of one of said respective pairs of pulses and having a duration representative of the time interval between receipt of said pulses of said one respective pair of pulses, each pulse of said comparing means train of pulses having either one polarity representing that said pulse of said delay means train of pulses of said respective pair being received by said comparing means prior to said pulse of said sensing means train of pulses of said respective pair, or an opposite polarity representing that said pulse of said delay means train of pulses of said respective pair being received after said pulse of said sensing means train of pulses of said respective pair;
integrating means receiving said comparing means output pulses for providing a signal representative of the sum of said comparing means output pulses of said one polarity minus the sum of said comparing means output pulses of said opposite polarity; and
speed control means associated with said rotatable member for receiving said output signal of said comparing means and for controlling the rotational speed of said rotatable member in accordance with said output signal of said comparing means to cause the rotational speed of said rotatable member to approach said desired rotational speed.

24. A servo valve for use in a system for adjusting the rotational speed of an output shaft of a variable speed drive having an actuating piston for controlling the clamping pressure applied to a disc stack located in a fluid reservoir and including a source of pressurized liquid acting on said piston, the valve comprising:
a housing including first passage means for fluidly communicating said piston and second passage means for fluidly communicating said first passage means and said reservoir;
relief means located in said second passage means for selectively controlling the magnitude of pressure in said first passage means; and
control means for varying said relief means in accordance with a desired output speed for said output shaft.

25. A servo valve as claimed in claim 24 wherein said relief means includes a flapper plate means disposed within said second passage means.

26. A servo valve as claimed in claim 25 wherein said flapper plate means includes means defining a bleed passage therethrough.

27. A servo valve as claimed in claim 25 including spring means disposed in said second passage means for biasing said flapper plate means in a direction away from said first passage means.

28. A valve as claimed in claim 25 wherein said control means includes a solenoid means disposed on said housing for actuating said flapper plate means in accordance with the desired output speed for said output shaft.

* * * * *

UNITED STATES PATENT OFFICE
CERTIFICATE OF CORRECTION

PATENT NO. : 3,851,742

DATED : December 3, 1974

INVENTOR(S) : Gordon M. Sommer, Alfred C. Williams and Donald C. Carlson

It is certified that error appears in the above-identified patent and that said Letters Patent are hereby corrected as shown below:

Column 3, line 31, "with" should be --within--. Column 4, line 30, "puse" should be --pulse--. Column 5, line 35, "netWork" should be --network--. Column 12, line 15, "ONe" should be --One--. Column 13, line 21, the word "start" should be in quotes. Column 14, line 15, after "which" insert --said--. Column 16, after line 65, insert the following subparagraph: --means receiving said comparing means control signal for adjusting the rotational speed of said output shaft to cause said output shaft to approach said desired rotational speed.--

Signed and Sealed this eleventh Day of November 1975

[SEAL]

Attest:

RUTH C. MASON
Attesting Officer

C. MARSHALL DANN
Commissioner of Patents and Trademarks